US008086993B2

(12) United States Patent  
Lerro (10) Patent No.: US 8,086,993 B2  
(45) Date of Patent: Dec. 27, 2011

(54) SORTING TABLES IN A PAGE BASED APPROACH

(75) Inventor: Marco Lerro, Rome (IT)

(73) Assignee: International Business Machines Corporation, Armonk, NY (US)

(*) Notice: Subject to any disclaimer, the term of this patent is extended or adjusted under 35 U.S.C. 154(b) by 898 days.

(21) Appl. No.: 11/931,321

(22) Filed: Oct. 31, 2007

(65) Prior Publication Data

US 2008/0183709 A1 Jul. 31, 2008

(30) Foreign Application Priority Data

Nov. 30, 2006 (EP) .................................. 06024831

(51) Int. Cl.
*G06F 9/44* (2006.01)
(52) U.S. Cl. ........ 717/100; 717/105; 717/124; 717/125; 709/201; 709/213; 707/600; 707/801
(58) Field of Classification Search .................. 707/748, 707/747, 741, 752, 600, 801; 709/206, 201, 709/213; 717/100, 105, 124, 125
See application file for complete search history.

(56) References Cited

U.S. PATENT DOCUMENTS

2007/0055660 A1* 3/2007 Anderson ......................... 707/4
2007/0156685 A1* 7/2007 Inoue et al. ....................... 707/7

\* cited by examiner

*Primary Examiner* — Hung T Vy
*Assistant Examiner* — Tuan-Khanh Phan
(74) *Attorney, Agent, or Firm* — Garg Law Firm, PLLC; Rakesh Garg; Jeffrey S. LaBaw (57) ABSTRACT

A solution is proposed for reducing the response time of query submitted by a client to server and, at the same time optimizing the sorting time of the results. Some canonical sorting algorithms are conceived to produce the first sorted records as soon as possible even if the sort operation is not completed. Even if such kind of algorithms match the above described needs, they could become impracticable because of their computational complexity. On the other side, some other algorithms have a lower computational complexity but the sorted result can be available only after the last iteration when the algorithm has completed. The present invention provides an improved method which combines the advantages of both families of algorithms.

20 Claims, 7 Drawing Sheets

SORTING TABLES IN A PAGE BASED APPROACH

FIELD OF THE INVENTION

The present invention relates to the information technology field. More specifically, the invention relates to the downloading of information in a data processing system.

BACKGROUND ART

Downloading of information is a commonplace activity in data processing systems with distributed architecture. In this context, different server computers (or simply servers) manage shared information. This information can be accessed by a great number of users by means of their own client computers (or simply clients), which are connected to the servers in a network; for this purpose, the information selected by each user must be transferred from the relevant server to his/her client. A typical example is the Internet, wherein many servers control large databases; in this case, each client may submit a query to a server for retrieving records of a specific database—suitably filtered and sorted.

However, the time required to download the selected information (from the server to the client through the network) may be a problem in an interactive application—wherein the selected information must be displayed on a monitor of the client in "real time"; indeed, this substantially increases the response time of the application (from the submission of a request to the availability of the corresponding result), with a deleterious effect on its usability.

The problem is particular acute when a large amount of information must be downloaded from the server to the client (such as in the case of a long query executed on a big database). Moreover, the problem is exacerbated when the server is far away from the client and/or a relatively slow connection is available between them (as it often occurs in the Internet).

Page-based navigation techniques have been proposed to mitigate the above-mentioned drawbacks. In this case, the selected information is logically partitioned into blocks—each one consisting of the amount of information that fits a page being displayed on the monitor of the client. In this way, a first page is provided to the user as soon as it is received from the server (without waiting for the complete downloading of the selected information); moreover, the user may also move to next pages immediately (if they are already available).

In a typical user interface program (e.g. web-based) a large table is usually browsed by breaking the table itself in smaller consecutive pages. In this way the user can quickly get partial results and start its analysis without waiting for the entire table to be transferred at the user interface program.
Such approach tries to minimize what is usually called the user interface responsiveness. Such property is defined as the time elapsed from the user request submission to the result termination which allows the user to submit a new request. The provided result may potentially be a convenient and consistent part of the result which allows the user to submit a new request to get a new part of the same result. Common scenarios require the table to be sorted in order to better and quicker analyze the result. In some cases the user is prevalently interested to the first page of the sorted result which are usually enough to take the appropriate action. In other instances a user might start analyzing the first sorted pages and then decide to move to next pages searching what is looking for. Some canonical sorting algorithms (e.g. the bubble sort) are conceived to produce the first sorted records as soon as possible even if the sort operation is not completed.

Even if such kind of algorithms matches the above described needs, they could become impracticable because of their computational complexity (e.g. the bubble sort in the worst case has a $O(n^2)$ complexity). On the other side, some other algorithms based on the divide and conquer technique (e.g. the merge sort algorithm) have a better computational complexity (usually $O(n.\log(n))$ complexity) but the sorted result can be available only after the last iteration when the algorithm has completed. From such analysis each kind of algorithms only matches a part of the requirements for the above described needs.

An improved method which combines the advantages of both families of algorithms would be highly appreciated.

It is an object of the present invention to overcome the above described drawbacks of the prior art.

SUMMARY OF THE INVENTION

The present invention provides a solution for sorting logic blocks having a set of parameters, during downloading of information from a source structure in a data processing system. A downloading request is received from a client entity of the system for downloading selected information, including a plurality of logic blocks, from the source structure wherein the blocks must be ordered in a list according to at least one of the set of parameters. The plurality of blocks are sorted using a first sorting algorithm until a portion of the ordered list including the first block of the ordered list is identified. The blocks of the portion of the ordered list are downloaded to the client. The invention continues to sort the remaining plurality of blocks using a second sorting algorithm, the second algorithm having a computational complexity lower than the first algorithm.

REFERENCE TO THE DRAWINGS

The invention itself, as well as further features and the advantages thereof, will be best understood with reference to the following detailed description, given purely by way of a nonrestrictive indication, to be read in conjunction with the accompanying drawings, in which.

DETAILED DESCRIPTION

Figure 1:
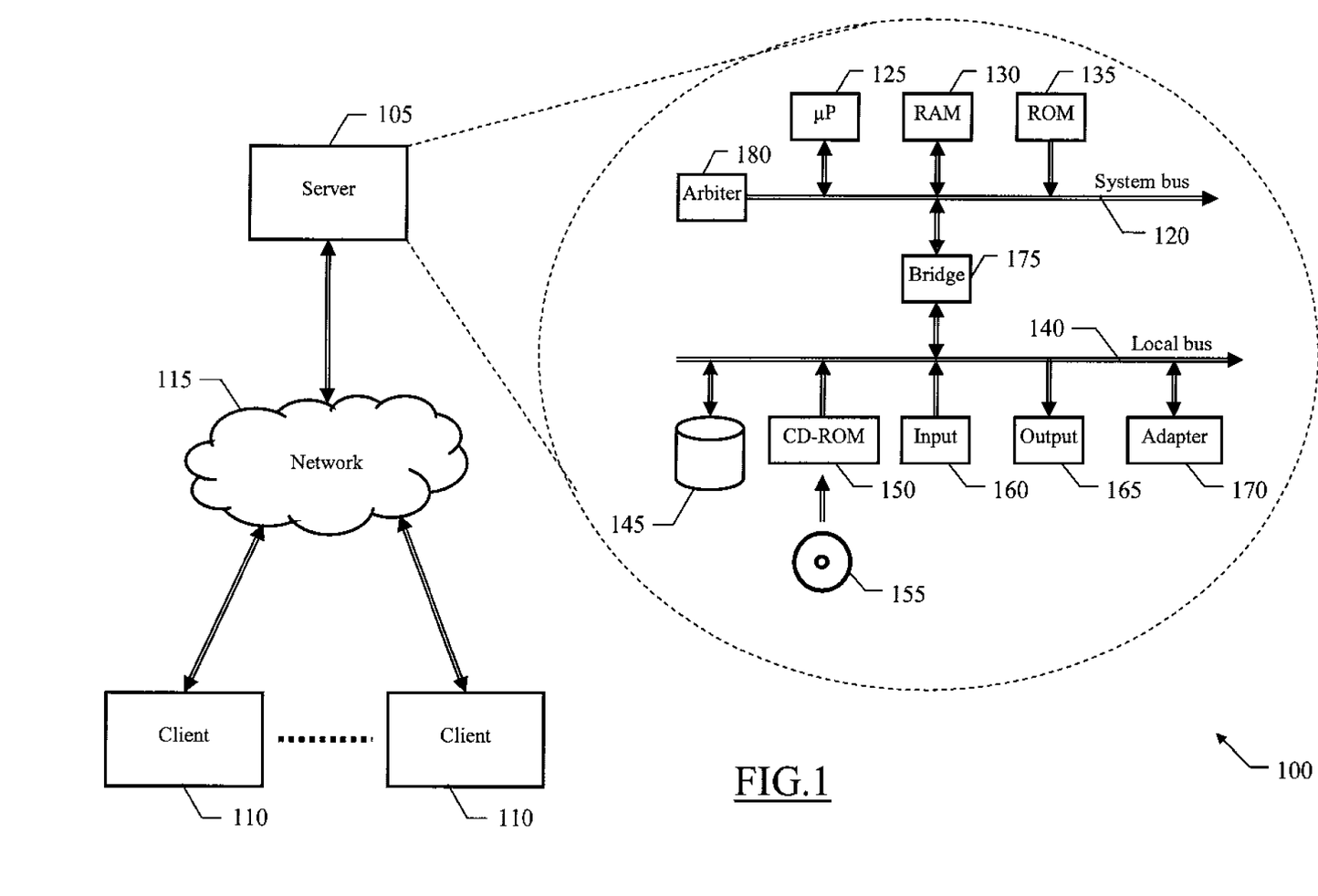
FIG. 1 is a schematic block diagram of a data processing system in which the solution according to an embodiment of the invention is applicable.

With reference in particular to FIG. 1, a distributed data processing system 100 is illustrated. The system 100 has a client/server architecture, wherein servers 105 (only one shown in the figure) manage shared information (such as large databases). Users of multiple clients 110 download selected information from the server 105 (for example, consisting of the result of a query on a specific database). For this purpose, the server 105 and the clients 110 communicate through a network 115 (such as the Internet); typically, the network 115 is implemented by means of telecommunication channels (for example, telephone cables), which allow each client 110 to access the (remote) server 105.

Particularly, the server 105 consists of a computer being formed by several units that are connected in parallel to a system bus 120. In detail one or more microprocessors (μP) 125 control operation of the server 105; a RAM 130 is directly used as a working memory by the microprocessors 125, and a ROM 135 stores basic code for a bootstrap of the server 105. Several peripheral units are clustered around a local bus 140 (by means of respective interfaces). Particularly, a mass memory consists of one or more hard-disks 145 and drives 150 for reading CD-ROMs 155. Moreover, the server 105 includes input units 160 (for example, a keyboard and a mouse), and output units 165 (for example, a monitor and a printer). An adapter 170 is used to connect the server 105 to the network 115. A bridge unit 175 interfaces the system bus 120 with the local bus 140. Each microprocessor 125 and the bridge unit 175 can operate as master agents requesting an access to the system bus 120 for transmitting information. An arbiter 180 manages the granting of the access with mutual exclusion to the system bus 120.

Figure 2:
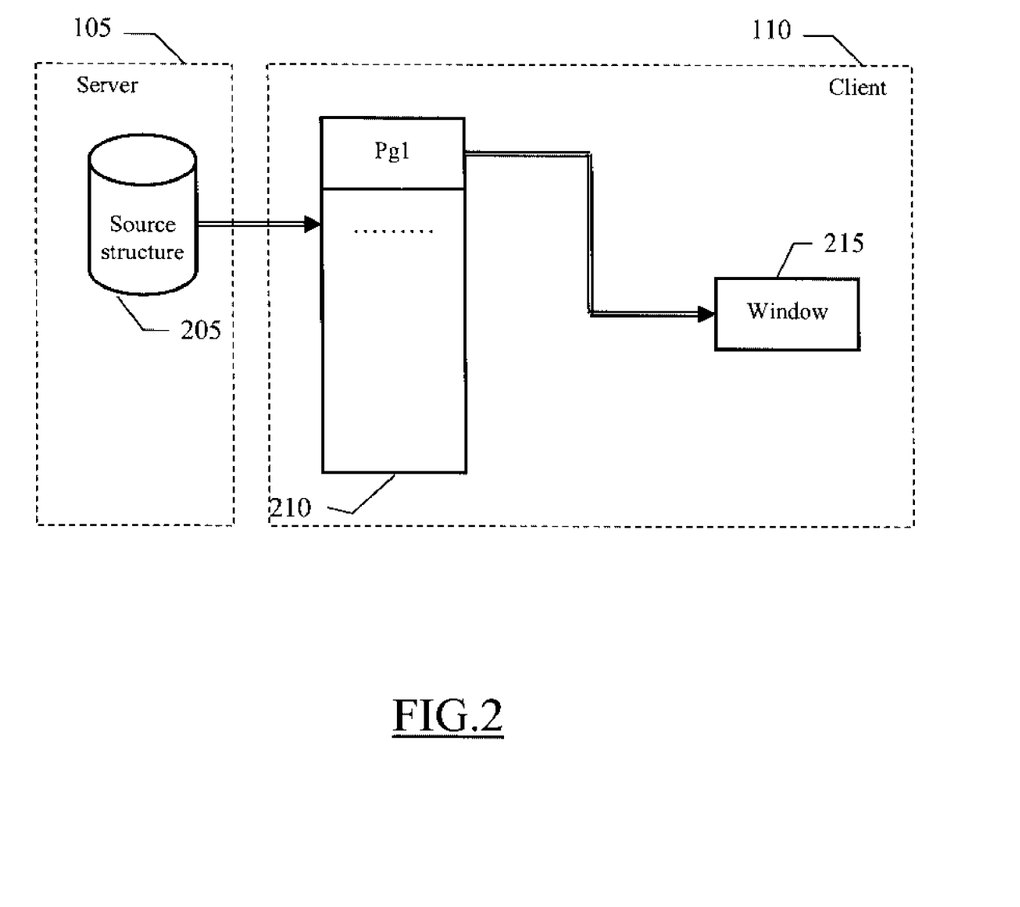
FIG. 2 illustrates an exemplary application of the solution according to an embodiment of the invention.

With reference now to FIG. 2, whenever the user of a generic client 110 needs to browse selected information (e.g. as a result of a query in a database) organized in a sorted table from the server 105, s/he submits a corresponding request to the server 105; for example, the request consists of a query for selecting desired records of a database (with the specification of filtering conditions and ordering criteria).

The information is available on the server 105 in a corresponding source structure 205 (the database in the example at issue). However, the source structure 205 could have some problems in accessing parts of the selected information directly (such as the records of the database matching the filtering conditions of the query); in other words, it might be difficult to browse through the selected information in the source structure 205. Therefore, when a specific part of the selected information is desired, it might be better to extract the selected information from the source structure 205 in succession until the desired part thereof is reached.

In the solution according to an embodiment of the present invention, as described in detail in the following, when the server 105 receives the request from the client 110 it starts downloading the information in an intermediate structure 210 which is more easily accessible by the client 215. The intermediate structure 210 stores the information downloaded from the source structure 205 in a snapshot repository. A snapshot is an image of the source structure 205 at download time.

Preferably, the selected information collected in the intermediate structure 210 is logically organized into pages; in a preferred embodiment of the present invention, each page consists of a block of information, which fits a physical page to be displayed in a window 215 on the monitor of the client 110.

In any case, other embodiment of the present invention are possible, e.g. The sorting operation might be done directly on the source structure.

The sorting process of the table is done using two different algorithms having different characteristics. The first algorithm is of the type with an higher complexity, which has the drawback of being slower, but provides the advantage of presenting the first page of the ordered list as soon as possible while the sorting process is still in progress. After the first page has been displayed to the user, the sorting method switches to another type of algorithm of a lower complexity, but having the drawback of not providing any sorted subset of the table, until all the table is sorted.

In this way, it is possible for the user to start working on the first pages of the table without waiting for the rest of the table to be sorted, but at the same time with a better responsiveness than using only a complex algorithm. According to a preferred embodiment of the present invention, the algorithm with a higher computational complexity is used only for obtaining the pages when required (e.g. the first pages), than the method switches to the lower complex algorithm which is faster but does not provide any useful results until the whole table is sorted.

The proposed solution represents the best compromise between the two categories of algorithms avoiding the main drawbacks of both categories.

Considering now FIG. 3a-3e a representation of the method according to a preferred embodiment of the present invention with reference to an example table is shown.

Figure 3A:
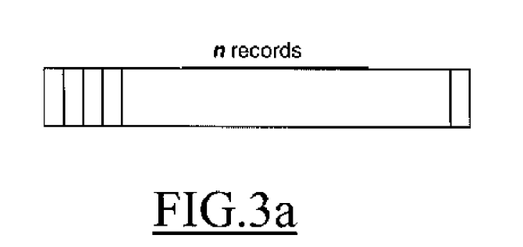
FIG. 3a-3e show a representation of the method according to an embodiment of the invention.
Figure 3B:
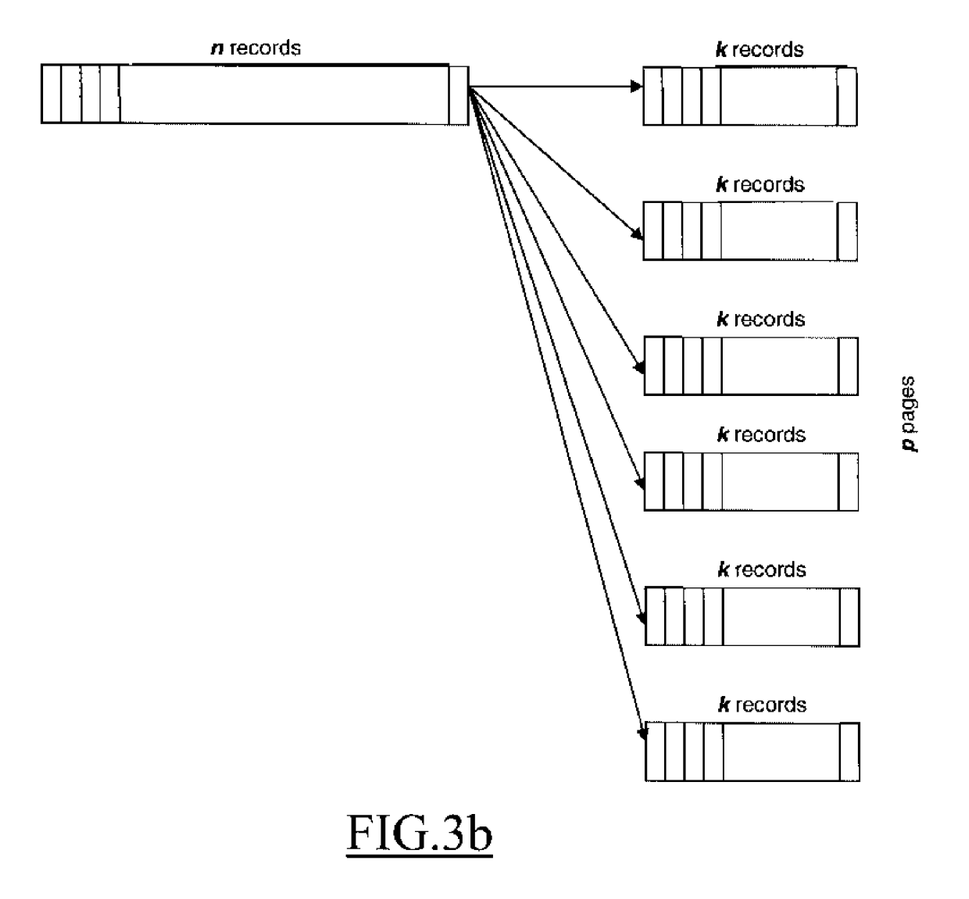

FIG. 3a shows a table of n records and the number of page records is k. The number of pages is about p=int (n/k). Then the table is divided into p pages each one containing k records (see FIG. 3b).

Figure 3C:
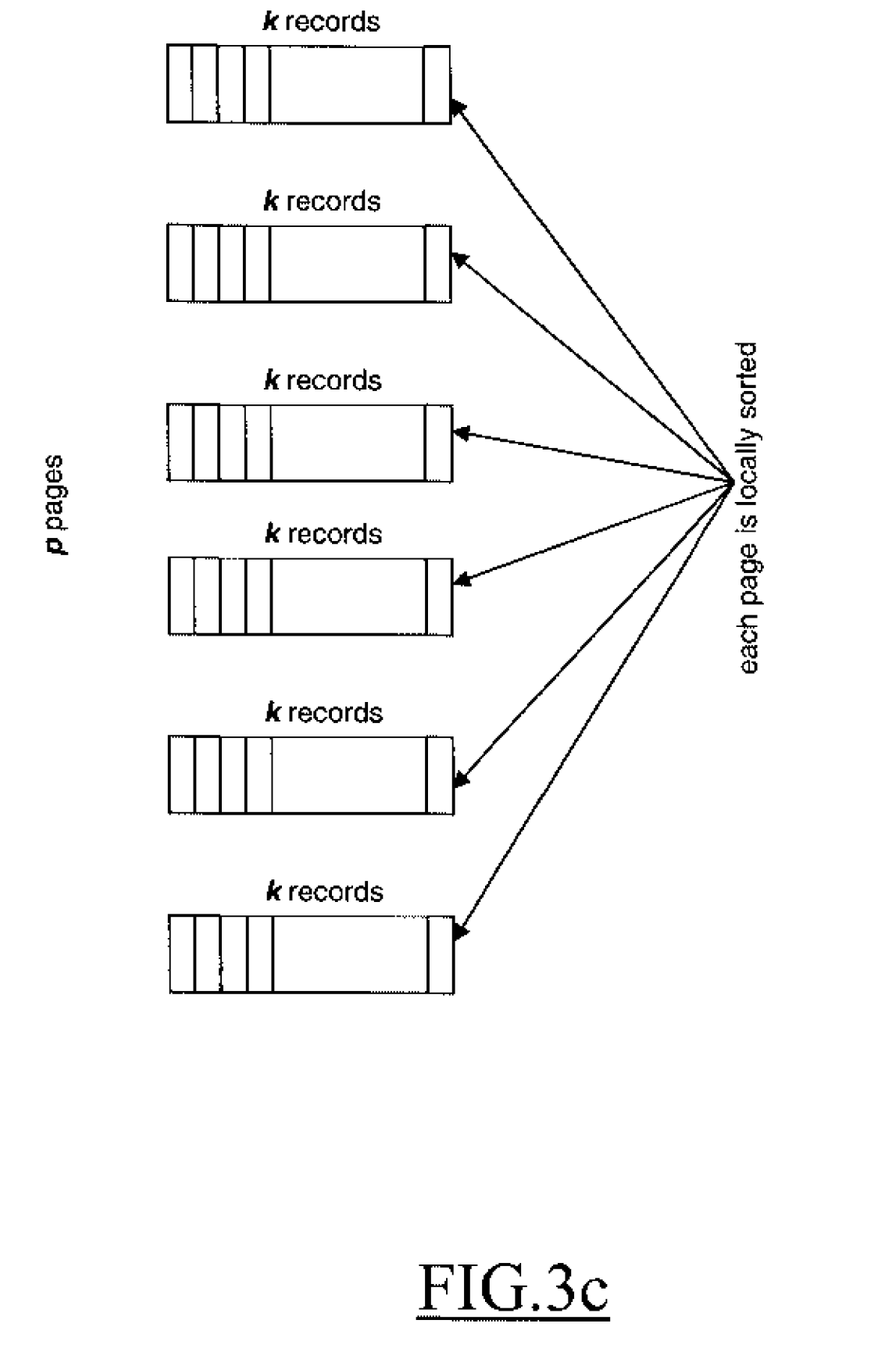

FIG. 3c shows an additional optional step which could help in getting the table partially sorted while part of it is still downloading: each page is preventively sorted by using a divide and conquer technique. However the sorting process does not require such step to be performed. The required computational complexity to do that is $O(p \cdot k \cdot \log(k))$.

Figure 3D:
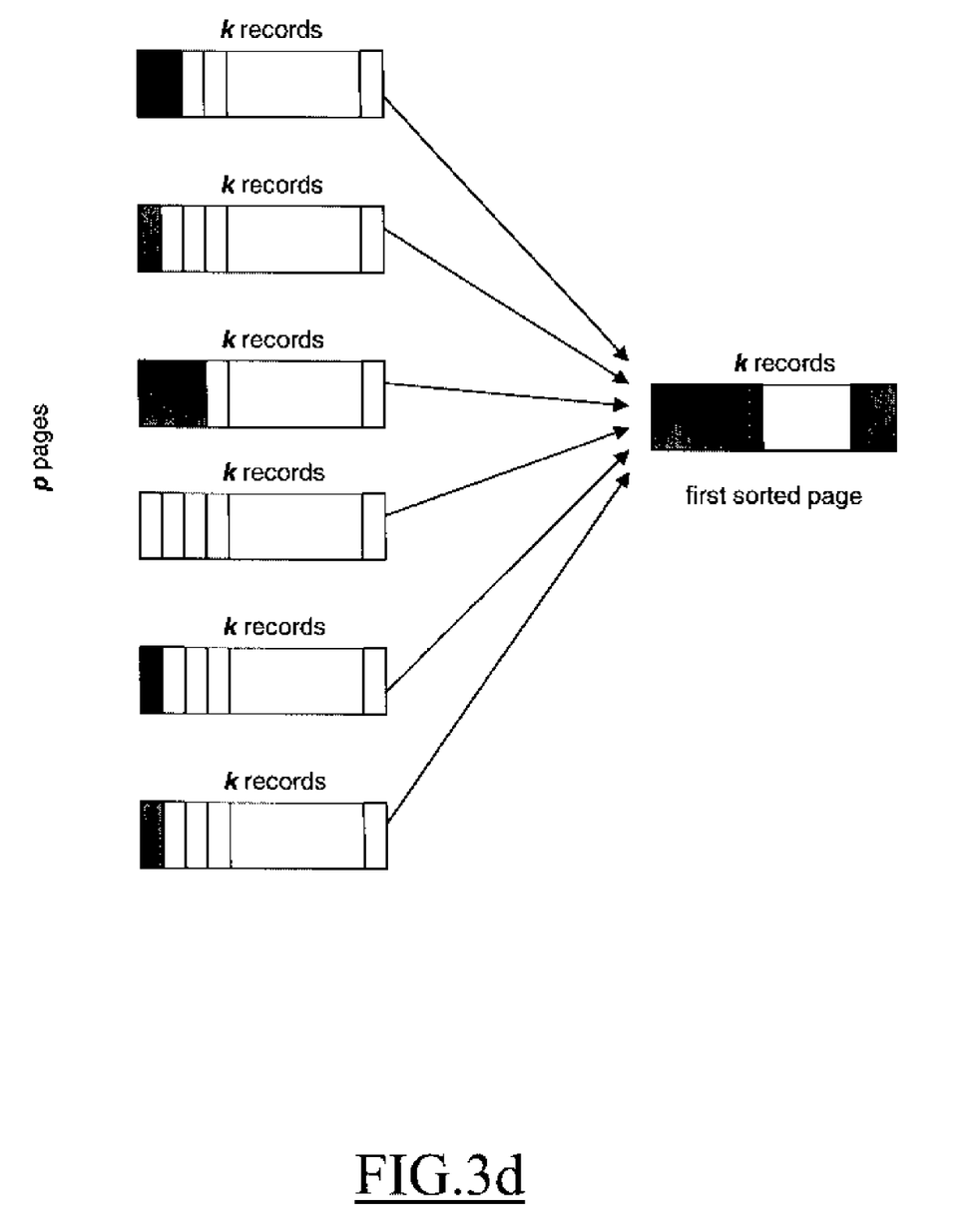

Going to FIG. 3d, the sorting process starts. The first sorted page is obtained by getting the records matching the sorting rule from the top of each page. Such operation has a computational complexity of $O(k \cdot p)$. The page is returned to the user which can start analyze the first sorted records. The sorted page is removed from the records to be sorted and placed in the sorted table.

Figure 3E:
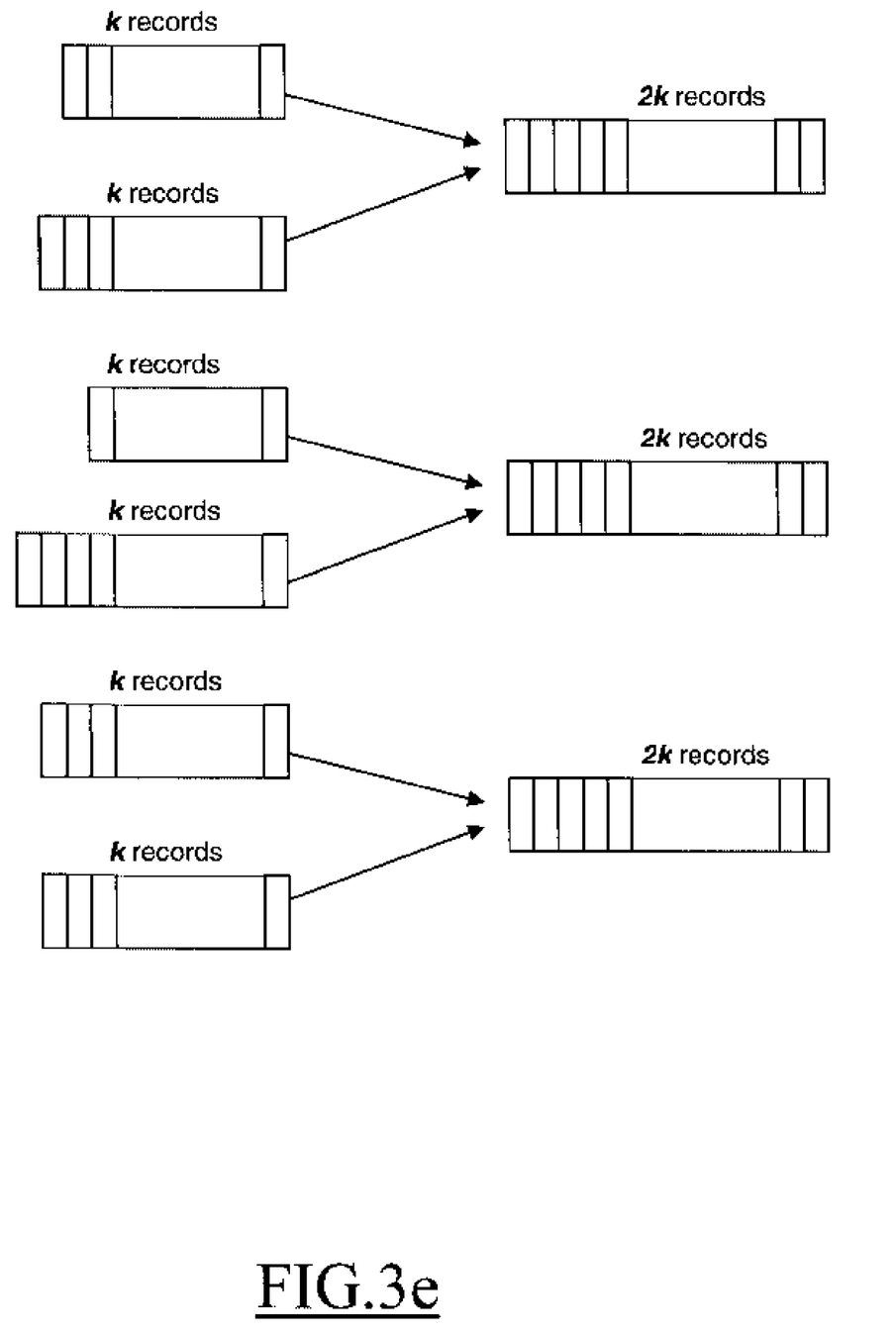

At this point a merging algorithm, based on the divide and conquer technique is applied to the p available pages (see FIG. 3e). The computational complexity is $O(k \cdot p \cdot \log(p))$. At each iteration (of a total number of $\log(p)$ iterations) the number of pages to be merged is halved while the number of records for each page is doubled.

During the above described merging operation, the user could require a new page (let's say the $i^{th}$ page). Instead of waiting the above merging operation to be completed, it can be stopped when the current iteration completes. At this point, the required $i^{th}$ page can be retrieved by switching again to a sorting algorithm with a higher complexity which is capabale to provide the required page without waiting the completion of the whole sorting operation. The computational complexity of such operation is $O(i \cdot k \cdot p)$, The obtained page is then returned to the user. The sorted pages (from the $2^{nd}$ to the $i^{th}$) are removed from the records to be sorted and placed in the sorted table. The merging algorithm is restarted at the next iteration.

Figure 4:
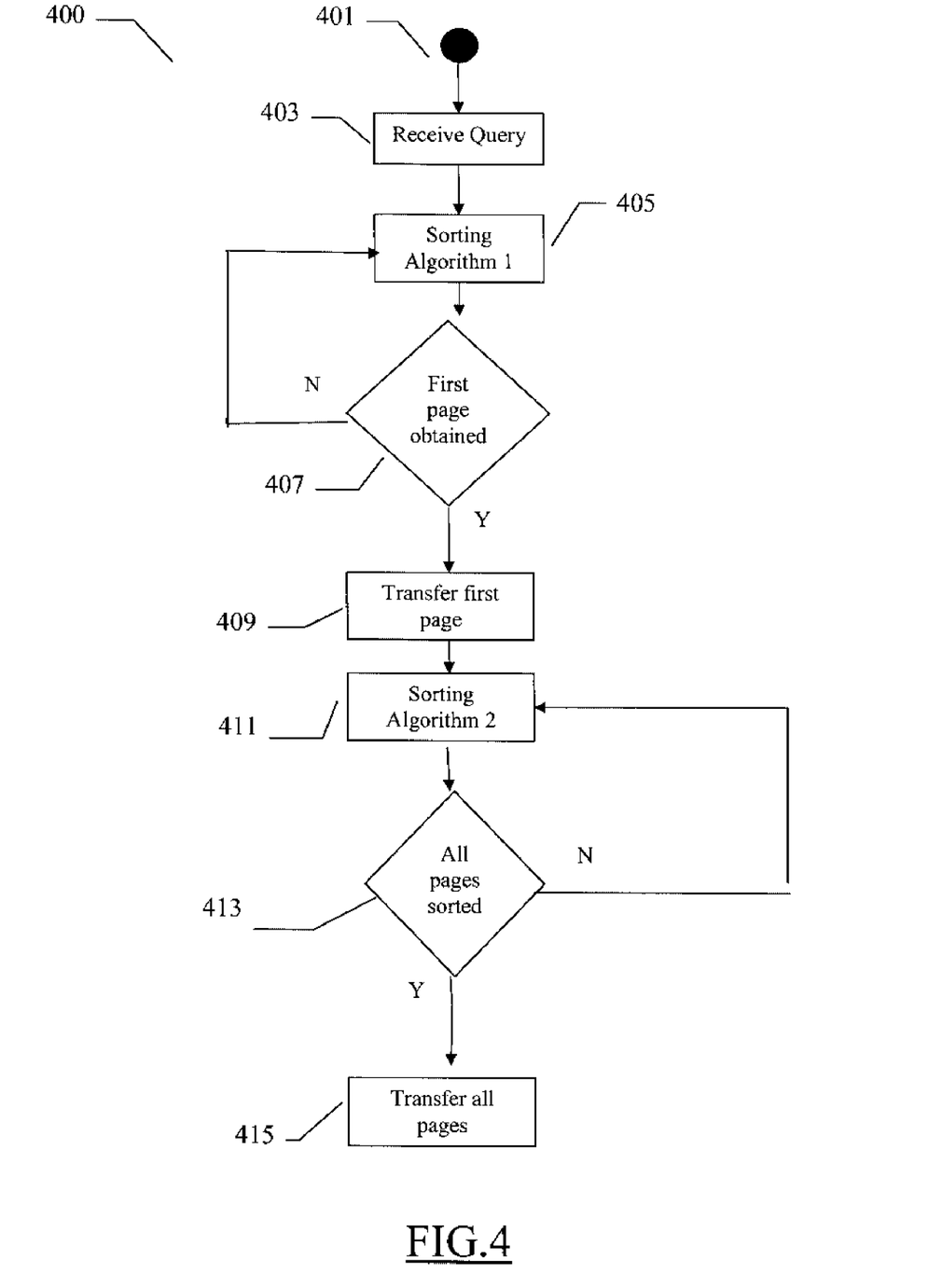
FIG. 4 is a diagram describing the flow of activities relating to an implementation of the solution according to an embodiment of the invention.

Passing now to FIG. 4, the logic flow of an exemplary process that can be implemented in the above-described system to download the result of a desired query is represented with a method 400.

The method begins at the start block 401 and passes to block 403 where a query from a client is received. The method starts sorting the pages (405) using a sorting algorithm having a high computational complexity, until the first page is obtained (block 407). The first page is then transmitted (409) to the client which can start its activity. The control passes to block 411 where the remaining pages are sorted using a second sorting algorithm until all the pages are sorted (413) and transmitted to the client (415).

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

Particularly, similar considerations apply if the system has a different structure or includes equivalent servers and/or clients. In any case, the proposed solution lends itself to be applied to download whatever kind of information, which is adapted to be logically organized in tables of any size (such as pages of documents, sections of reports, and the like. Conversely, the selected information is copied on any other form allowing accessing its blocks directly; this includes memory structures of the direct-access type in strict terms, but even different memory structures wherein the time required to access any block is far lower than the one required to retrieve it from the original source (for example, a sequential file for a tape).

It is also important to note that the sorting process described above which uses different algorithms having different computational complexity according to the needs can also be used in different contexts and environment, whenever a plurality of logic items must be sorted according to a predefined order.

Likewise, the same advantages are more evident when the selected information is transmitted from the server to the client through telephone cables, wireless connections, mobile infrastructures, or more generally any other telecommunication channels (wherein the corresponding transmission speeds are relatively low); however, nothing prevents applying the proposed solution in a local area network, on in any other data processing system (even for downloading information on a central unit of a computer from its peripheral units).

As described above, the solution according to an embodiment of the invention has been specifically designed for applications wherein the selected information is displayed on a monitor of the client. Alternatively, the same idea may be also applied when the selected information is printed, or processed in any other way on the client.

The use of different pages for the selected information is within the scope of the invention; for example, the blocks may fit dedicated frames of a window, or any other structure adapted to be displayed in succession on the monitor of the client.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (by using similar steps, removing some steps being not essential, or adding further optional steps—even in a different order). In any case, the program may take any form suitable to be used by or in connection with any data processing device, such as external or resident software, firmware, or microcode (either in object code or in source code). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like.

In any case, the solution according to the present invention lends itself to be implemented with a hardware structure (for example, integrated in a chip of semiconductor material), or with a combination of software and hardware.

Even though in the preceding description reference has been made to a physical implementation of the proposed solution on the server, this is not to be intended as a limitation. Indeed, in a different embodiment of the invention the same solution may be deployed by means of a service, which is offered by a corresponding provider.

Alternatively, the proposed method may be implemented on a computer with a different architecture or that includes equivalent units (such as cache memories temporarily storing the programs or parts thereof to reduce the accesses to the mass memory during execution); more generally, it is possible to replace the computer with any code execution entity (such as a PDA, a mobile phone, and the like).

The invention claimed is:

1. A method for sorting logic blocks having a set of parameters, during downloading of information from a source structure in a data processing system, the method including the steps of:
receiving a downloading request from a client entity of the system for downloading selected information, including a plurality of logic blocks, from the source structure wherein the logic blocks must be ordered in a list according to at least one of the set of parameters;
starting sorting the plurality of logic blocks using a first sorting algorithm until a portion of the ordered list including the first logic block of the ordered list is identified;
downloading the logic blocks of the portion of the ordered list to the client;
removing the logic blocks of the portion from the plurality of blocks; and
continuing sorting remaining plurality of logic blocks using a second sorting algorithm, the second algorithm having a computational complexity lower than the first algorithm.

2. The method of claim 1 further comprising:
before starting sorting operation, transferring the selected information from the source structure to an intermediate structure and performing the sorting operation on the intermediate structure.

3. The method of claim 1, wherein the source structure is a database.

4. The method of claim 3 wherein the first sorting algorithm includes an algorithm having a $O(n^2)$ complexity.

5. The method of claim 4 wherein the first sorting algorithm includes a bubble sort algorithm.

6. The method of claim 1, wherein the second sorting algorithm includes an algorithm having a $O(n.\log(n))$ complexity.

7. The method of claim 6 wherein the second sorting algorithm includes a merge sort algorithm.

8. The method of claim 1 further comprising the step of:
responsive to a request form the client switching to a third sorting algorithm having a computational complexity higher than the second algorithm.

9. A computer program in a computer readable non-transitory medium for performing a method for sorting logic blocks having a set of parameters, when the computer program is executed on a data processing system, the method comprising:

receiving a downloading request from a client entity of the system for downloading selected information, including a plurality of logic blocks, from the source structure wherein the logic blocks must be ordered in a list according to at least one of the set of parameters;

starting sorting the plurality of logic blocks using a first sorting algorithm until a portion of the ordered list including the first logic block of the ordered list is identified;

downloading the logic blocks of the portion of the ordered list to the client;

removing the logic blocks of the portion from the plurality of blocks; and continuing sorting the remaining plurality of logic blocks using a second sorting algorithm, the second algorithm having a computational complexity lower than the first algorithm.

10. A system for sorting logic blocks having a set of parameters, during downloading of information from a source structure in a data processing system, the system comprising:

a storage device including a storage medium, wherein the storage device stores computer usable program code; and a processor, wherein the processor executes the computer usable program code, and wherein the computer usable program code comprises:

computer usable code for receiving a downloading request from a client entity of the system for downloading selected information including a plurality of logic blocks, from the source structure wherein the logic blocks must be ordered in a list according to at least one of the set of parameters;

computer usable code for starting sorting the plurality of logic blocks using a first sorting algorithm until a portion of the ordered list including the first logic block of the ordered list is identified;

computer usable code for downloading the logic blocks of the portion of the ordered list to the client;

computer usable code for removing the logic blocks of the portion from the plurality of blocks; and computer usable code for continuing sorting the remaining plurality of logic blocks using a second sorting algorithm, the second algorithm having a computational complexity lower than the first algorithm.

11. The method of claim 1, further comprising:

diving the plurality of logic blocks into a plurality of pages, the portion being a page in the plurality of pages and including a subset of the plurality of logic blocks, wherein a number of logic blocks present in a second page in the plurality of pages reduces as a result of removing the logic blocks of the page, and wherein continuing sorting the remaining plurality of logic blocks using the second sorting algorithm comprises:

sorting the reduced number of logic blocks within the second page and logic blocks in a third page to form a sorted second page and a sorted third page; and merging the sorted second and third pages.

12. The computer program of claim 9, further comprising:

before starting sorting operation, transferring the selected information from the source structure to an intermediate structure and performing the sorting operation on the intermediate structure.

13. The computer program of claim 9, wherein the source structure is a database.

14. The computer program of claim 13, wherein the first sorting algorithm includes an algorithm having a $O(n^2)$ complexity.

15. The computer program of claim 14, wherein the first sorting algorithm includes a bubble sort algorithm.

16. The computer program of claim 9, wherein the second sorting algorithm includes an algorithm having a $O(n.log(n))$ complexity.

17. The method of claim 16, wherein the second sorting algorithm includes a merge sort algorithm.

18. The computer program of claim 9, further comprising the step of:

responsive to a request form the client switching to a third sorting algorithm having a computational complexity higher than the second algorithm.

19. The computer program of claim 9, further comprising:

diving the plurality of logic blocks into a plurality of pages, the portion being a page in the plurality of pages and including a subset of the plurality of logic blocks, wherein a number of logic blocks present in a second page in the plurality of pages reduces as a result of removing the logic blocks of the page, and wherein continuing sorting the remaining plurality of logic blocks using the second sorting algorithm comprises:

sorting the reduced number of logic blocks within the second page and logic blocks in a third page to form a sorted second page and a sorted third page; and merging the sorted second and third pages.

20. The system of claim 10, further comprising:

computer usable code for diving the plurality of logic blocks into a plurality of pages, the portion being a page in the plurality of pages and including a subset of the plurality of logic blocks, wherein a number of logic blocks present in a second page in the plurality of pages reduces as a result of removing the logic blocks of the page, and wherein continuing sorting the remaining plurality of logic blocks using the second sorting algorithm comprises:

computer usable code for sorting the reduced number of logic blocks within the second page and logic blocks in a third page to form a sorted second page and a sorted third page; and computer usable code for merging the sorted second and third pages.

* * * * *